United States Patent

[11] 3,572,562

| [72] | Inventor | Jesse B. Floyd, Jr.<br>755 Yell Road, Lewisburg, Tenn. 37091 |
|---|---|---|
| [21] | Appl. No. | 772,102 |
| [22] | Filed | Oct. 31, 1968 |
| [45] | Patented | Mar. 30, 1971 |

[54] ADJUSTABLE CASKET SUPPORT FOR AUTOMOBILES
3 Claims, 6 Drawing Figs.

[52] U.S. Cl. .................................................. 224/42.42, 296/18
[51] Int. Cl. ...................................................... B60r 11/00, B60p 3/26
[50] Field of Search ........................................ 224/42.42, 42.42 (A); 214/84, 83.24 (D); 296/16—18; 5/118

[56] References Cited
UNITED STATES PATENTS

| 2,206,762 | 7/1940 | Breeden | 296/18 |
| 2,400,312 | 5/1946 | Miller | 296/17X |
| 2,460,712 | 2/1949 | Peterson | 214/84X |
| 2,790,184 | 4/1957 | Testa | (224/42.42A)UX |
| 3,436,770 | 4/1969 | Turner | 5/118X |

*Primary Examiner*—Robert G. Sheridan
*Attorney*—Clarence A. O'Brien & Harvey B. Jacobson ABSTRACT: Supporting rails engage the forward and rearward seat of an automobile sedan. A base member is clamped to an intermediate portion of the rail members, the base member being adapted to support a small size casket thereon. The base member includes adjustable means for contacting the sides of a casket thereby inhibiting sliding motion of the casket during transport. Roller means are provided in the base member for reducing the effort required to slide the casket across the upper surface of the base member.

Patented March 30, 1971

Jesse B. Floyd, Jr.
INVENTOR.

BY *Clarence A. O'Brien*
*and Harvey B. Jacobson*
Attorneys

Patented March 30, 1971

Jesse B. Floyd, Jr.
INVENTOR.

BY *Clarence A. O'Brien*
and *Harvey B. Jacobson*
Attorneys

ADJUSTABLE CASKET SUPPORT FOR AUTOMOBILES

The present invention relates to casket supports and more particularly to a portable casket support for automobiles.

The prior art includes a number of portable devices for supporting a child's casket in an automobile. One such device comprises a platform member adapted to be supported by a rear automobile seat. Collapsible legs engage the car floor thereby rendering support to the platform. However, such devices do not elevate the casket to a height enabling the viewing of the casket while the same is being transported in an automobile.

The present invention includes a platform supported by rail members, the latter being engaged between the forward and rear auto seat back portions. The present device will adjust to fit any conventional sedan automobile and enables a funeral director or like individual to keep a small sized casket level in full view of the family following the car while the latter is leading a procession.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
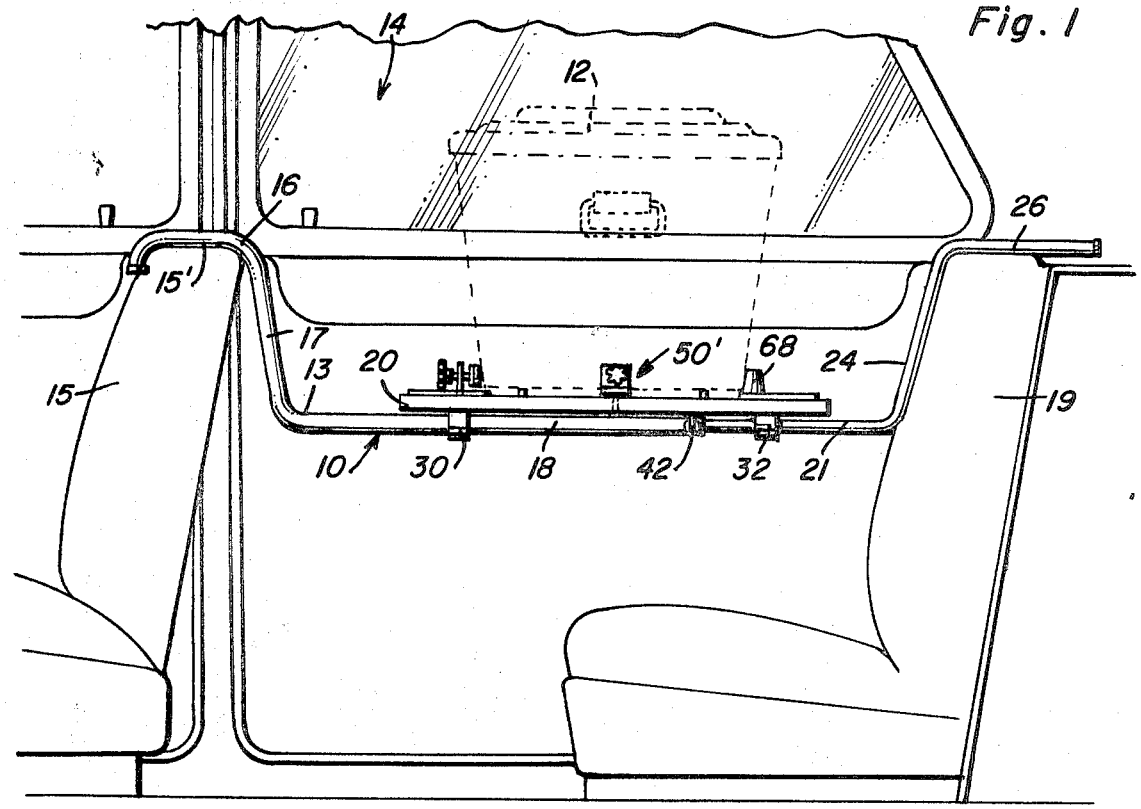
FIG. 1 is an end elevational view illustrating the disposition of the present invention in an automobile interior.
Figure 2:
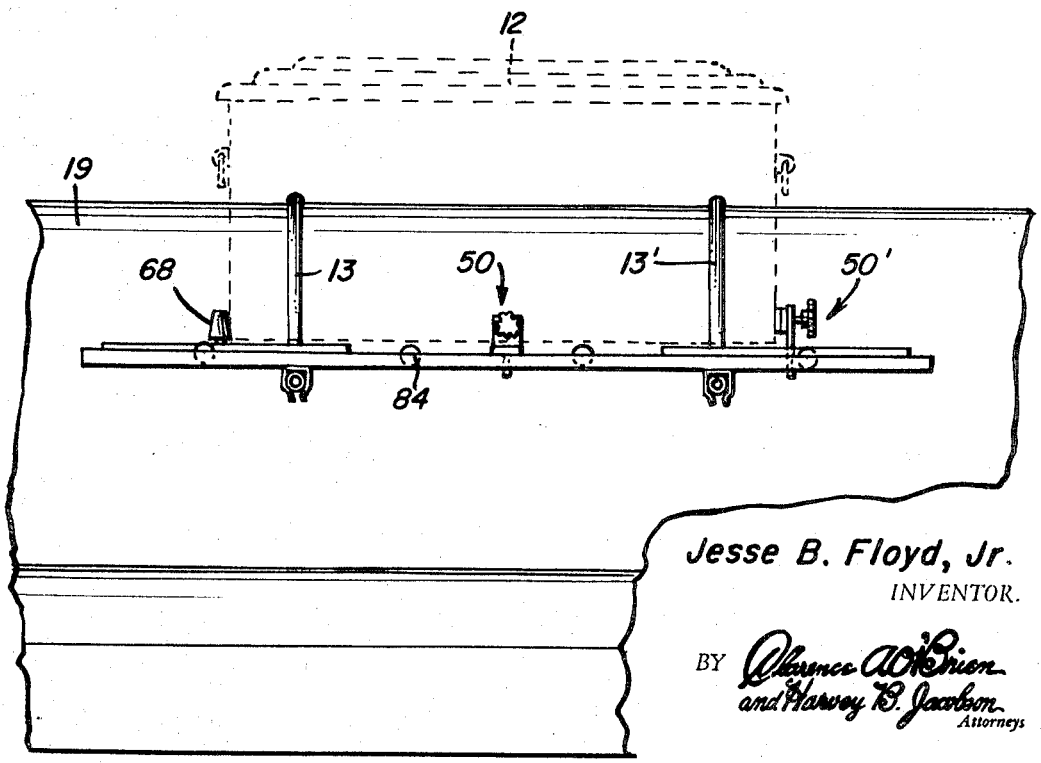
FIG. 2 is a side elevational view of the device illustrated in FIG. 1.
Figure 3:
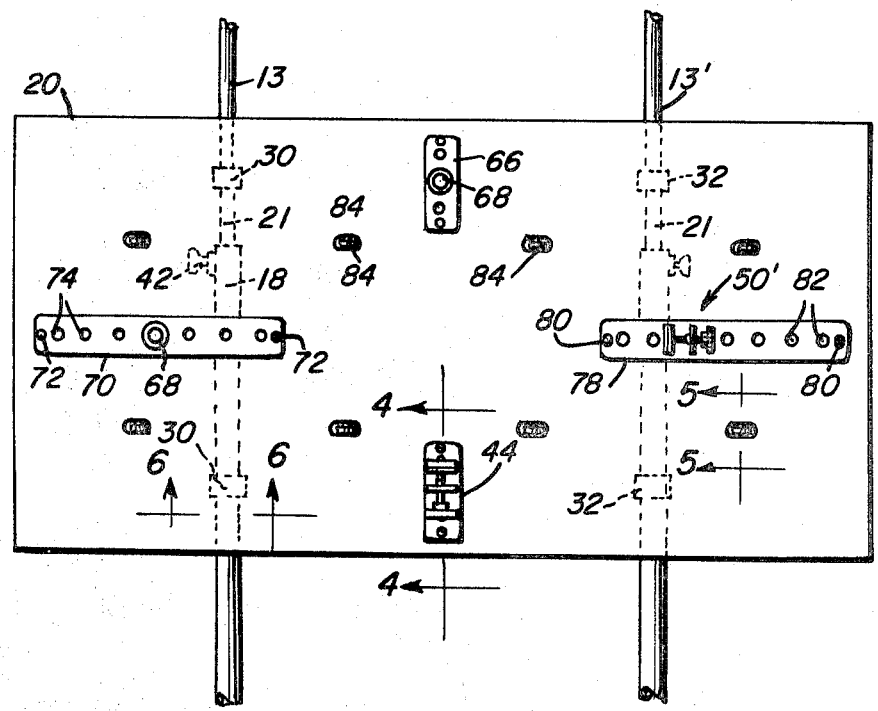
FIG. 3 is a top plan view of a base member included in the present invention.

Referring specifically to the drawings and more particularly to FIG. 1 there is shown an adjustable casket support generally denoted by 10 for supporting a child sized casket 12 illustrated in phantom. As will be noted, the height of the support is such as to render the casket visible from a line of sight level with the windows of the vehicle. Observing FIG. 1, the present invention is disposed within the rearward portion of an automobile interior 14. As seen in FIG. 1—3, two supporting rail members 13 and 13', of the telescoping type, are disposed between the forward automobile seat 15 and rearward seat 19. Considering each of the rails, a first end portion 16 is somewhat hook-shaped to conform with and engage the upper edge 14' of the forward seat 15. A second rail section 17 appending inwardly and being downwardly inclined from the first section 16 is deformed at an interior point thereof to a horizontal elongated straight section 18. A similar straight rail section 21 is concentrically disposed within the aforementioned section 18 thereby forming telescoping engagement. The rail member 21 is upwardly and outwardly bent to form a continuing section 24 similar to the aforementioned section 17, as will be noted from FIG. 1, rail section 24 is adapted to contact the back portion of rear seat 19 thereby inhibiting rearward displacement or motion of the rail member. The outward end portion of the rail member is indicated by 26 and is seen to include a substantially horizontal section integrally appending from the aforementioned inclined section 24. The horizontal section 26 contacts the upper edge of the rear seat 19 thereby rendering vertical support to the rail member. As FIG. 1 illustrates, each rail member 13 and 13' is deformed so that when they are mutually connected to a base or support board 20, a rigid and secure support for casket 12 is obtained.

Figure 6:
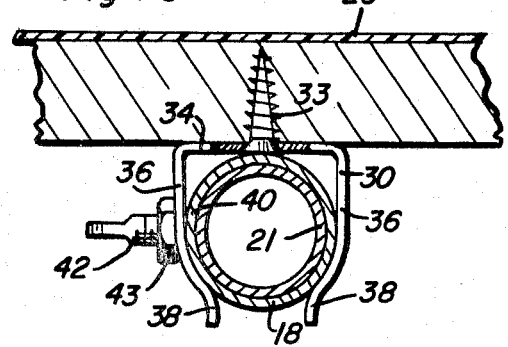
FIG. 6 is a partial longitudinal view taken along a plane passing through section line 6—6 of FIG. 3 which shows a clamping member for connecting a base member and associated support rails.

In FIGS. 1 and 3, there are shown a pair of transversely aligned spring clamp members 30 connected to the undersurface of base member 20 for engaging rail member 13. Likewise, a second pair of clamp members 32 are adapted to engage rail 13'. FIG. 6 illustrates the relation between the clamp members 30 and 32 with associated rail members 13 and 13' respectively.

Referring to FIG. 6, clamp member 30 which is indentical to clamp member 32 is shown to be fastened to the underside of base member 20 by means of suitable fastener 33. Each clamp member includes a horizontal portion 34 appending to perpendicularly outwardly extending portions 36 which in turn taper to outward end portions 38. The latter mentioned end portions confront one another and form an entrance to the clamp member 30. Thus, in order to connect base member 20 to the rail members 13 and 13', a rail member need only be snapped or clamped into its associated clamping members.

Considering the telescoping adjustment shown in FIG. 6, the radially outward pipe section 18 includes an aperture 40 which receives a threaded thumbscrew 42 therein. The inward end of the thumbscrew is adapted to bear against the radially inward rail section 21. The outward end portion of the thumbscrew 42 includes a nut 43 thereon which bears against the cylindrical exterior surface of rail portion 18. Thus, in order to adjust the length of a particular rail member 13 or 13', the thumbscrew 42 is unscrewed and the rail member adjusted. Next, the thumbscrew 42 is tightened thereby causing fixed engagement between rail sections 18 and 21. Nut 43 serving as a lock nut is tightened to maintain the fixed position until a later time.

Figure 4:
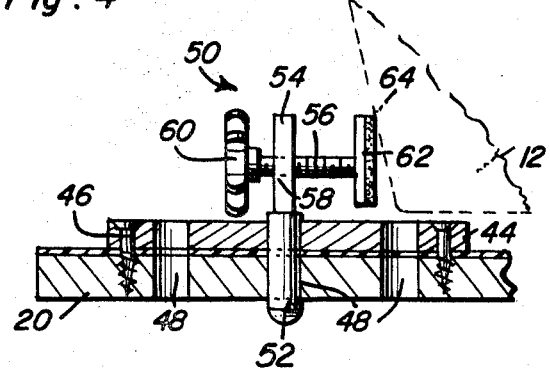
FIG. 4 is a side elevational view of an adjustable pressure pad assembly, taken along a plane passing through section line 4—4 in FIG. 3.

The present invention utilizes two basic devices for retaining a casket 12 in its mounted position upon a board member 20. These members include an adjustable pressure pad and an adjustably positioned bumper device. Considering the pressure pad device first, FIGS. 3 and 4 illustrate an elongated rectangular plate 44 securely fastened to the upper surface of base member 20 by means of suitable fasteners 46. The rectangular plate 44 includes a number of longitudinally spaced apertures which are positioned in registry with similarly dimensioned apertures formed in the base member 20. Thus, transverse bores 48 are formed. A pressure pad assembly indicated by numeral 50 includes a pin or peg element 52 which integrally mounts a flange element 54 having a threaded aperture 58 therein for receiving a threaded screw portion 56, the latter having a hand or knurled knob 60 on an outward end thereof. The inward end of the screw portion mounts a pressure pad element 62 which is disposed to contact a lower edge portion of the casket 12 as indicated by 64. In a typical design, as shown in FIG. 3, plate member 44 is transversely directed at a longitudinal intermediate point inwardly adjacent from a lateral side of base member 20.

An oppositely disposed plate member 66 includes a number of apertures therein similar to the apertures for bores 48 shown in FIG. 4. The purpose of the latter mentioned plate member 66 is to receive a bumper device 68 having a peg element similar to element 52 shown in FIG. 4. The bumper element 68 may be adjusted in any of the apertures formed in plate member 66 thereby accommodating caskets of various widths. A third plate member 70 similar to plate member 66 but longer in length is suitably mounted along the center line (not shown) of the base member. Plate member 70 is suitably fastened to the base member 20 by means of suitable fasteners 72 and includes a number of longitudinally spaced apertures 74 similar to those previously discussed in connection with plate members 44 and 66. The apertures are adapted to receive a bumper member 68 in an adjusted position. As seen in FIG. 2, the latter mentioned bumper member 68 is adapted to contact a point immediately inwardly adjacent the lower edge of a first casket end.

An additional plate member 78 similar in appearance to plate member 70 is mounted in oppositely disposed relation to plate member 70, in adjacent relation to a second transverse end of board member 20. Apertures 82 identical to apertures 74 are longitudinally spaced in the plate member which in turn is connected to the base member 20 by means of suitable fasteners 80. Plate member 78 receives pressure pad assembly denoted by 50' which is identical to the assembly 50 illustrated in FIG. 4.

Figure 5:
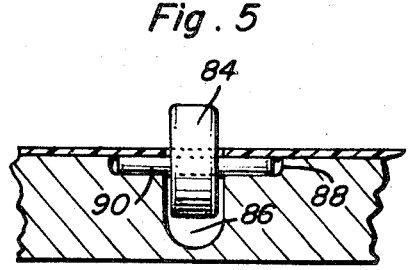
FIG. 5 is a partial transverse sectional view taken along a plane passing through section line 5—5, illustrating a roller member included in the present invention.

In order to minimize the effort required to slide a casket across base member 20, a number of roller members 84 are mounted at spaced intervals along two parallel and laterally spaced rows. Referring to FIG. 5, each roller member 84 is seen to be cylindrical in nature and fabricated from durable material such as metal, nylon, or the like. Each roller member 84 includes a central aperture therein for receiving an axial pin 90, The pin is recessed within a transversely formed recess 88 in the upper base member surface. As seen in FIG. 5, a second inwardly formed recess 86 receives the lower portion of roller member 84.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

I claim:

1. A casket support for automobiles having forward and rearward seats comprising parallel spaced telescoping rail members supported between the forward and rearward seats, a base member for removably mounting a casket, means for removably connecting the base member to the rail members and means for temporarily securing a casket on the base member, said rail members being located entirely under the base member along the width of said base member with the downward force created by the base member and casket being entirely supported by the top of the front and rear seats.

2. The device set forth in claim 1 wherein the means for removably connecting the base member to the rail members include a plurality of spring clamp members longitudinally aligned and fastened to the underside of the base member and adapted for clamping engagement of a colinearly positioned rail member.

3. The device as set forth in claim 2 wherein the base member includes a rectangular mounting surface, a plurality of plates attached to said mounting surface including a pair of longitudinally spaced and aligned longitudinal plates and a pair of transversely spaced and aligned transverse plates, each of said plates having a plurality of spaced apertures therein, a pressure pad mounted on one of the longitudinal plates and one of the transverse plates, and a bumper device mounted on the other two plates, said pressure pads and bumper devices including depending mounting pins received in selective apertures to adjust the position of the pads and bumper devices to receive different sizes of caskets, each of said pressure pads including a threadably adjusted pad element for clampingly engaging the casket for gripping the casket between the pressure pads and bumper devices to prevent disengagement of the casket from the base member.